United States Patent
Keppeler

(10) Patent No.: US 7,160,523 B2
(45) Date of Patent: Jan. 9, 2007

(54) DEVICE FOR PRODUCING HYDROGEN-CONTAINING GAS FOR A FUEL CELL SYSTEM

(75) Inventor: Berthold Keppeler, Owen (DE)

(73) Assignee: NuCellSys GmbH, Kirchheim (DE)

( * ) Notice: Subject to any disclaimer, the term of this patent is extended or adjusted under 35 U.S.C. 154(b) by 418 days.

(21) Appl. No.: 10/206,408

(22) Filed: Jul. 26, 2002

(65) Prior Publication Data

US 2003/0022950 A1  Jan. 30, 2003

(30) Foreign Application Priority Data

Jul. 28, 2001  (DE)  ................ 101 36 970

(51) Int. Cl.
*H01M 7/00* (2006.01)
*B01J 8/06* (2006.01)
(52) U.S. Cl. ............ 422/188; 48/61; 48/127.9; 48/128; 48/211; 422/198
(58) Field of Classification Search .......... 48/61, 48/62 R, 89, 93–95, 127.9, 128, 211–213, 48/214 R, 215, 214 A; 422/188–190, 198, 422/211, 222
See application file for complete search history.

(56) References Cited

U.S. PATENT DOCUMENTS

| | | | | |
|---|---|---|---|---|
| 3,982,962 A | * | 9/1976 | Bloomfield | .......... 429/19 |
| 4,522,894 A | * | 6/1985 | Hwang et al. | .......... 429/17 |
| 4,670,359 A | * | 6/1987 | Beshty et al. | .......... 429/17 |
| 4,781,241 A | * | 11/1988 | Misage et al. | .......... 165/140 |
| 5,360,679 A | * | 11/1994 | Buswell et al. | .......... 429/19 |
| 6,063,515 A | * | 5/2000 | Epp et al. | .......... 429/17 |
| 6,077,620 A | * | 6/2000 | Pettit | .......... 429/26 |

OTHER PUBLICATIONS

Olsen et al. "Unit Processes And Principles Of Chemical Engineering", D. Van Nostrand Co., Inc., Jul. 5, 1932, pp. 1-3.*

* cited by examiner

*Primary Examiner*—Alexa D. Neckel
(74) *Attorney, Agent, or Firm*—Crowell & Moring LLP

(57) ABSTRACT

A device for the production of hydrogen-containing gas for a fuel cell system, in particular in a motor vehicle, is disclosed. Suitable feed materials are water and at least one hydrocarbon-containing starting material, in particular a hydrocarbon derivative, such as methanol or ethanol. The device comprises an evaporator to evaporate the feed material; a superheater to superheat the feed material vapor; a high temperature reformer in which steam reforming of the superheated feed material is carried out; a burner which provides the thermal energy required for the steam reforming by burning a gas stream that contains fuel and oxygen; a water gas shift stage to reduce the carbon monoxide content of the reformate stream produced in the steam reforming; and a cooler to reduce the temperature of the reformate stream between the point where the reformate stream is discharged out of the high temperature reformer and the point where the reformate stream enters into the water gas shift stage.

8 Claims, 1 Drawing Sheet

US 7,160,523 B2

DEVICE FOR PRODUCING HYDROGEN-CONTAINING GAS FOR A FUEL CELL SYSTEM

CROSS-REFERENCE TO RELATED APPLICATION

The application claims priority to German Patent Application No. 101 36 970.0, filed Jul. 28, 2001, which application is hereby incorporated by reference in its entirety.

FIELD OF THE INVENTION

The invention is generally directed to a device to produce hydrogen-containing gas for a fuel cell system, whereby water and a hydrocarbon-containing substance, in particular a hydrocarbon derivative such as methanol, may be used as feed material for the production of the hydrogen-containing gas.

DESCRIPTION OF THE RELATED ART

Devices for producing hydrogen-containing gas for a fuel cell system, wherein a mixture of water and a hydrocarbon-containing substance is used as a feed material, typically include an evaporator, a reformer, and at least one burner for heating the reformer. Systems of this type are employed in motor vehicles powered by fuel cells, to carry out steam reforming of the generally liquid feed material, usually methanol, in order to provide hydrogen as a fuel to the fuel cells, without the need for large storage tanks to transport hydrogen on-board in gaseous and/or liquid form. Such systems typically include catalytic reformers, such as partial oxidation reactors, to produce hydrogen.

In order to keep the carbon monoxide content of the reformate stream as low as possible, since carbon monoxide generally presents a problem for the operation of fuel cells (e.g. the carbon monoxide disadvantageously affects the function of the electrodes and membranes in the fuel cells), the temperatures in the reformer during the steam reforming of methanol are usually approximately 250° C. to 300° C. Existing systems, however, suffer the disadvantage that they are designed specially for a particular fuel, since the temperatures and catalysts have to be carefully selected in order to achieve an acceptable efficiency and to obtain a stream of reformate gas that meets all requirements, in particular those relating to residual quantities of feed material and carbon monoxide.

Accordingly, there remains a need for a device for producing a hydrogen-containing gas for a fuel cell system, which device possesses a simple design, can process various types of fuels (particularly various alcohols), is not affected by contamination with long-chain hydrocarbon compounds in the fuel, and/or which offers good cold-starting characteristics.

The present invention fulfils one or more of these needs, and provides further related advantages.

BRIEF SUMMARY OF THE INVENTION

In brief, this invention is directed to a device for producing hydrogen-containing gas for a fuel cell system from a hydrocarbon-containing substance as the feed material.

In one embodiment, a device for producing hydrogen-containing gas from a feed material for a fuel cell system, operates on a feed material comprising water and a hydrocarbon-containing substance. The device comprises at least one evaporator capable of evaporating the feed material to yield a vapor; at least one superheater capable of superheating the vapor to yield a superheated feed material; a high temperature reformer capable of steam reforming the superheated feed material; a burner capable of providing the thermal energy required for steam reforming by burning a gas stream that contains fuel and oxygen; a water gas shift stage capable of reducing the carbon monoxide content of the reformate stream produced in the steam reforming; and a cooler capable of reducing the temperature of the reformate stream between the point where the reformate stream is discharged out of the high temperature reformer and the point where the reformats stream enters the water gas shift stage.

In further embodiments, a fuel cell system comprising the device of this invention, as well as a motor vehicle comprising the same, are disclosed.

Methods for producing hydrogen-containing gas from a feed material for a fuel cell system are also disclosed. Such a method comprises the steps of evaporating the feed material to yield a vapor; superheating the vapor to yield a superheated feed material; steam reforming the superheated feed material, wherein the thermal energy required for steam reforming is provided by a burner that burns a gas stream that contains fuel and oxygen; and reducing the carbon monoxide content of the cooled stream by a water gas shift reaction, wherein the reformate stream is cooled between the steam reforming step and prior to the step of reducing the carbon monoxide content.

Methods for starting-up a device of this invention are also disclosed, which methods comprise the steps of operating the high temperature reformer as a partial oxidation stage for a period of time immediately following start-up, and then operating the high temperature reformer as a steam reformer once a suitable operating temperature for high temperature reforming is reached.

These and other aspects of this invention will be apparent upon reference to the attached FIGURE and following detailed description.

BRIEF DESCRIPTION OF THE DRAWING

The FIGURE is a schematic representation of a device for producing a hydrogen-containing gas to supply a fuel cell in a fuel cell system.

DETAILED DESCRIPTION OF THE INVENTION

Figure 1:
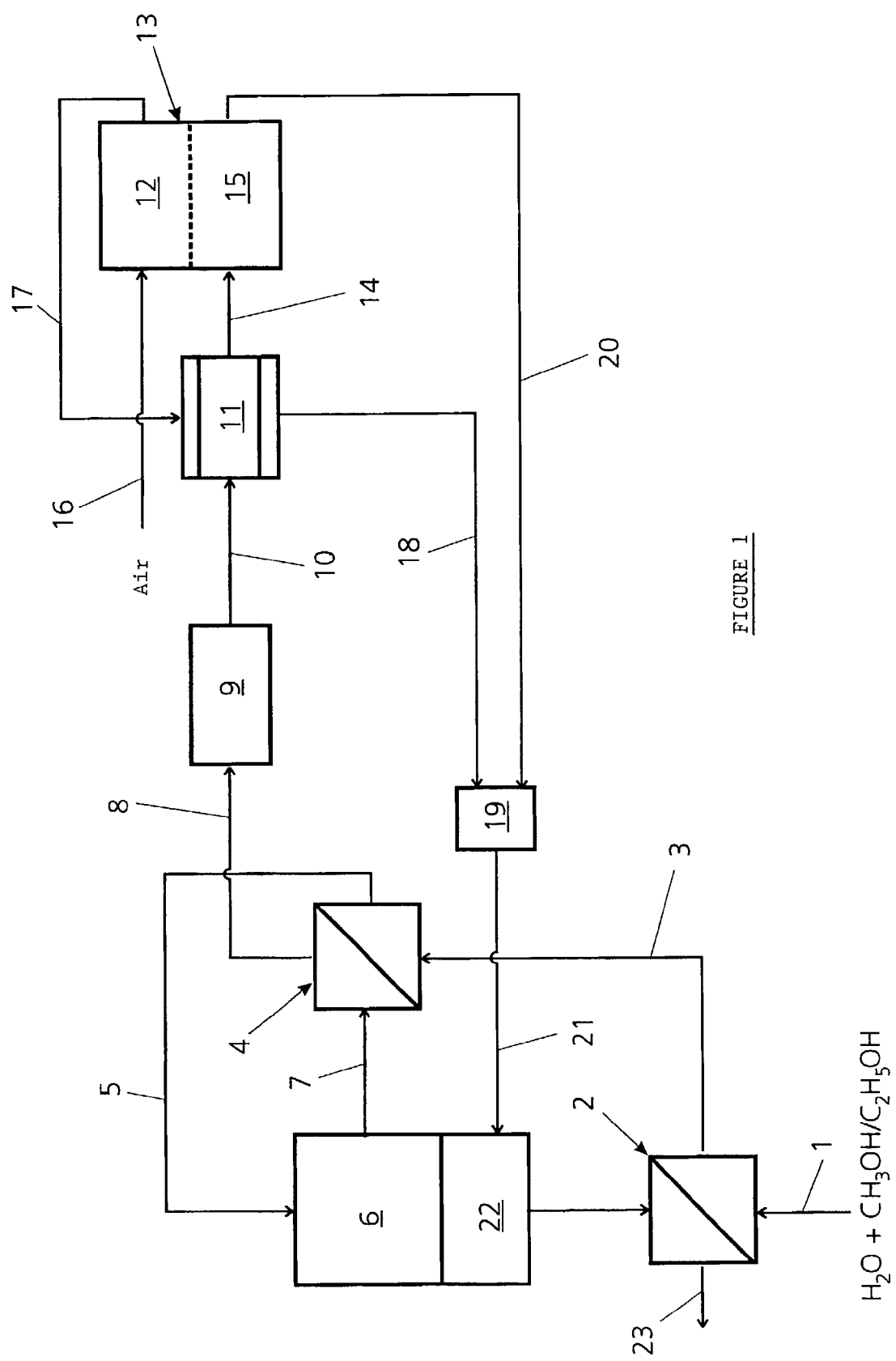

As noted above, this invention is directed to a device for producing hydrogen-containing gas for a fuel cell system from a hydrocarbon-containing substance as the feed material. The device comprises an evaporator, a high temperature reformer and at least one burner for heating the reformer, in a particularly favorable manner.

To solve the problem related to a high carbon monoxide content in the reformate gas stream, a water gas shift stage is included downstream—with respect to the flow direction of the reformats gas stream—of the high temperature reformer, which operates at temperatures that are significantly higher than reformers presently used in gas generation systems of this type. The water gas shift stage further increases the hydrogen content of the reformate gas stream, and lowers the carbon monoxide content by reacting water and carbon monoxide to form hydrogen and carbon dioxide.

To achieve a temperature gradient between the two stages, a cooler is provided between the high temperature reformer and the water gas shift stage. The high temperature reformer is heated by a burner that, in one embodiment, burns the exhaust gas from the fuel cell system and the residual fuel contained therein.

In a more specific embodiment, the feed material—usually water and a hydrocarbon derivative such as an alcohol (e.g., methanol or ethanol)—for the production of the hydrogen-containing reformate gas stream are evaporated, and the hot burner exhaust gas is utilized for the evaporation.

The feed material vapor is then directed to the high temperature reformer through a superheater (which can also serve as the cooler), where they are superheated by the hot reformate gas stream being discharged from the steam reformer. The superheater acts as a superheater for the feed material vapor which, in turn, cools the reformate gas stream exiting the high temperature reformer to a temperature level that makes it possible to feed it into the water gas shift stage without any intermediate stages. In the high temperature reformer, the superheated feed material is subjected to steam reforming, and typically high-temperature steam reforming.

This device offers significant advantages with respect to the utilization of energy. Due to the very high temperatures in the high temperature steam reformer, which are typically in a range between 400° C. and 600° C., the burner may be operated at a comparatively high temperature, since it is able to directly heat the high temperature reformer. At the same time, the feed material (e.g., water and methanol or ethanol) can be evaporated using the burner exhaust gas, which is slightly cooler than the above temperature level.

In an alternative embodiment, the water and the hydrocarbon derivative may be evaporated separately using two separate evaporators. If necessary, the water and the hydrocarbon derivative can also be superheated separately. Appropriate mixing may take place at a position between the metered injection and the high temperature reformer. As an alternative, a pre-mix may be utilized, which is then evaporated and superheated together.

This invention allows the conversion of methanol, as well as higher alcohols such as ethanol, without any modifications to the arrangement being necessary. Compared to methanol, ethanol offers some well-known advantages (e.g., it is non-toxic, can easily be produced from renewable resources, and possesses a higher energy content), which allows a vehicle equipped with such a system to achieve a higher operating range with the same volume of stored fuel.

Furthermore, operation with a high temperature reformer offers the advantage that hydrocarbon-containing impurities in the respective fuel are, to a significant degree, converted in the reformer due to the high operating temperature and do not detrimentally affect downstream components.

Extremely long-chained molecules that are not converted are cracked, which reduces their effect on downstream components, and can allow conversion of such cracked constituents in the downstream components.

Since the carbon monoxide concentration in the reformate gas stream is significantly reduced by the water gas shift stage (e.g., to values below 1% by volume), the complexity of the fuel cell system's gas purification system can be reduced. For example, in one embodiment, a downstream selective oxidation system may be utilized. The selective oxidation system may require further cooling of the reformate stream, which, in a typical embodiment, takes place by using the exhaust gas from the cathode chamber of the fuel cell, prior to an adiabatic selective oxidation stage, which further reduces the residual carbon monoxide.

A further advantage of this invention is that it allows a very rapid cold-start of the device. In a method for starting a device of this invention, immediately after start-up the high temperature reformer may be temporarily operated as a partial oxidation stage. This leads to a immediate heating of the reformer by means of partial oxidation. The substances provided by the partial oxidation can subsequently flow through other components, to heat those as well. Subsequently, these substances—after being bypassed around the anode chamber of the fuel cell—are fed to the burner, where—as during regular operation—they are combusted to generate additional heat. Rapid heating of the entire system is thus achieved due to the heat generated by operating the high temperature reformer as a partial oxidation stage initially and by operating the burner with the system exhaust gases.

As illustrated in the FIGURE, feed materials—such as water and a hydrocarbon derivative (shown as methanol or ethanol)—are fed to evaporator 2 through pipe 1 and then to superheater 4 through pipe 3. From superheater 4, the superheated vapor of water and hydrocarbon derivative reaches high temperature reformer 6 through pipe 5.

The reformate stream produced in high temperature reformer 6 is returned to superheater 4 through pipe 7, whereby the reformate stream serves as a heat-supplying medium and thus is cooled to a significantly lower temperature level by the vapor of feed material that is to be superheated. Thus, superheater 4 simultaneously acts as cooler 4 for the reformate stream.

The reformate gas stream (which has been cooled from an original temperature of 400° C. to 600° C. in the high temperature reformer to a temperature level between approximately 200° C. to 300° C.) is transported by pipe 8 to water gas shift stage 9, wherein the carbon monoxide contained in the reformate gas stream reacts with the residual water vapor to form carbon dioxide and hydrogen. This allows one to achieve a carbon monoxide concentration below 1% by volume in pipe 10.

The reformate gas stream, with its reduced carbon monoxide concentration, is then fed to a gas purification device, which in this case is illustrated as a selective oxidation system 11. The selective oxidation system is cooled by the exhaust gas stream from cathode chamber 12 of fuel cell 13, which is directed through pipe 17, establishing an operating temperature that is ideally suited for the selective oxidation. Another effect of the cooling of the reformate stream in the selective oxidation stage is that the hydrogen-containing gas with very low carbon monoxide concentration can be directly supplied to anode chamber 15 of fuel cell 13 through pipe 14.

In fuel cell 13, the hydrogen-containing gas reacts, together with an oxygen-containing gas (e.g., air), which is fed into cathode chamber 12 of fuel cell 13 through pipe 16, to generate electrical power. The exhaust gas from cathode chamber 12 of fuel cell 13 is conducted through pipe 17 to selective oxidation system 11, which is thereby cooled as described above.

Upon exiting the selective oxidation system 11 via pipe 18, exhaust gas from cathode chamber 12 of fuel cell 13 is fed to mixer 19. Through pipe 20, exhaust gas from anode chamber 15 of fuel cell 13 is also directed to mixer 19. Through pipe 21, the mixture of these two exhaust gases, which contains both oxygen and fuel, is fed to burner 22. In burner 22, the gas stream is either burned directly, or—in a more specific embodiment—is burned catalytically, whereby the generated thermal energy is used to heat high temperature reformer 6. The exhaust gas from burner 22 is fed to evaporator 2, where they surrender their residual heat to the feed material being evaporated. From evaporator 2, the burner exhaust gas is discharged into the surroundings through exhaust gas pipe 23. It may optionally be cleaned in a downstream purification stage (not shown).

This allows a direct coupling of burner 22 (including a catalytic burner) with high temperature reformer 6 by, for example integrating the high temperature reformer 6 with the burner 22 as a plate heat exchanger.

In the practice of this invention, other modifications are included within the scope of this invention. For example the reformate stream may be cooled entirely, or together with the above-described device, by exhaust gas of fuel cell 13, such that the exhaust gas enters burner 22 at an already high temperature level, which further improves efficiency. Similarly, the cooler 4 and water gas shift stage 9 may be integrated into one component, effectively creating a water gas shift stage 9 with an integrated cooler 4.

Depending on equilibrium conditions, carbon monoxide is formed during the steam reforming in high temperature reformer 6, which is subsequently converted in the downstream water gas shift stage 9 at the above-mentioned operating temperature of 200° C. to 300° C. The water gas shift stage 9 may be operated adiabatically, or may be cooled by exhaust gas from fuel cell 13 (not shown).

The reformate gas stream in pipe 10, with its reduced carbon monoxide concentration, is converted to carbon dioxide by selective oxidation in selective oxidation unit 11, which may contain one or more stages, such that a hydrogen-containing reformate stream with a carbon monoxide concentration of almost zero is directed to fuel cell 13. As illustrated in the FIGURE, selective oxidation stage 11 can be cooled by the cathode exhaust gas. At the same time, the gas that will later flow into burner 22 is preheated, and the reformate gas stream is further cooled to operating temperature of fuel cell 13.

The evaporator that is used for the feed material is operated using the waste heat contained in the exhaust gas of burner 22, while the heat that is produced directly by burner 22 is supplied directly to high temperature reformer 6.

As mentioned above, this design makes it possible to use either ethanol or methanol without any need for modifications.

In addition, this invention permits advantageous starting procedures, for which the direct thermal coupling between burner 22 and high temperature reformer 6 creates very favorable conditions. During a cold-start of the system, high temperature reformer 6 may be operated as a partial oxidation stage, which a short period of time after start-up provides enough gas to start burner 22. The heat from the partial oxidation heats high temperature reformer 6, as well as components downstream of the reformer. At the same time, the exhaust gas produced by burner 22 pre-heats the evaporator, bringing the entire system to operating temperature within a very short time period. Accordingly, the cold-starting phase, which should be as short as possible if the system is used in a motor vehicle, is significantly shortened.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A device for producing hydrogen-containing gas from a feed material for a fuel cell system, wherein the feed material is water and a hydrocarbon-containing substance, comprising:
    at least one evaporator for evaporating the feed material to yield vapor;
    at least one superheater for superheating the vapor to yield a superheated feed material;
    a high temperature reformer for steam reforming the superheated feed material;
    a burner for directly heating the high temperature reformer and providing the thermal energy required for steam reforming by burning a gas stream that contains fuel and oxygen, wherein the burner is connected to the at least one evaporator so that the thermal energy content of exhaust gas of the burner is used for the evaporation of the feed material;
    a water gas shift stage for reducing the carbon monoxide content of a reformate stream produced in the steam reforming;
    a cooler for reducing the temperature of the reformate stream between the point where the reformate stream is discharged out of the high temperature reformer and the point where the reformate stream enters the water gas shift stage; and
    a gas purification system capable of further reducing the carbon monoxide content of the reformate stream located downstream, with respect to the flow direction of the reformate gas stream, of the water gas shift stage; wherein
    the gas purification system is a selective oxidation device having at least one stage; and
    the selective oxidation device is cooled by exhaust gas from a cathode chamber of the fuel cell.

2. The device of claim 1, wherein the superheater and the cooler are physically combined as a single component in which the starting material vapor is capable of being superheated by the thermal energy content of the reformate stream, while simultaneously cooling the reformate stream.

3. The device of claim 1, wherein the water gas shift stage and the cooler are physically combined as a single component.

4. The device of claim 1, wherein the burner is a catalytic burner.

5. The device of claim 1, wherein the gas stream of the burner comprises exhaust gas from a cathode and an anode chamber of at least one fuel cell of the fuel cell system.

6. The device of claim 1, wherein, during normal operation of the high temperature reformer, the temperature in the high temperature reformer ranges from about 400° C. to 600° C.

7. The device of claim 1, wherein, during normal operation of the water gas shift stage, the temperature in the water gas shift stage ranges from about 200° C. to 300° C.

8. The device of claim 1, wherein the hydrocarbon-containing substance is ethanol or methanol.

\* \* \* \* \*